LA TRELLE F. BUEHRIG.
OIL FORCE PUMP.
APPLICATION FILED MAR. 7, 1911.
1,005,594.
Patented Oct. 10, 1911.
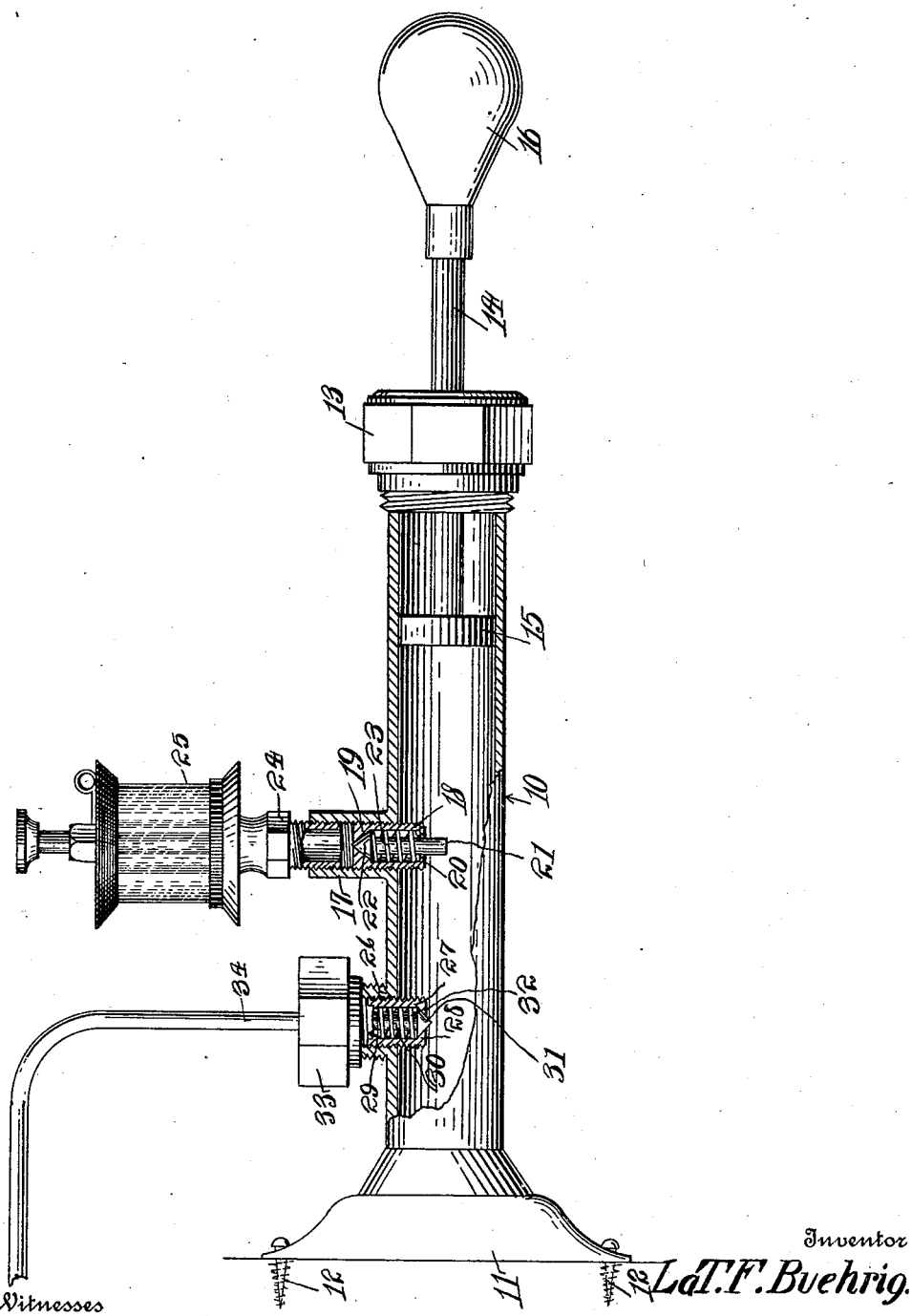
Witnesses
F. H. Taylor
Francis Boyle
Inventor
LaT. F. Buehrig.
By 
Attorneys

UNITED STATES PATENT OFFICE.

LA TRELLE F. BUEHRIG, OF WESSINGTON SPRINGS, SOUTH DAKOTA.

OIL FORCE-PUMP.

1,005,594. Specification of Letters Patent. Patented Oct. 10, 1911.

Application filed March 7, 1911. Serial No. 612,911.

*To all whom it may concern:*

Be it known that I, LA TRELLE F. BUEH-RIG, a citizen of the United States, residing at Wessington Springs, in the county of Jerauld, State of South Dakota, have invented certain new and useful Improvements in Oil Force-Pumps; and I do hereby declare the following to be a full, clear, and exact description of the invention, such as will enable others skilled in the art to which it appertains to make and use the same.

This invention relates to lubricant force pumps, and has for an object to generally improve and simplify the construction of this class of devices.

A second object of the invention is to provide a force pump that will be sufficiently powerful to urge a column of lubricant to a journal box at a considerable distance from the pump, novel means being provided for limiting play of the pump piston so that the piston performs actual work at every position in its stroke.

With the above objects in view the invention consists in certain novel details of construction and combination of parts hereinafter fully described and claimed, it being understood that various modifications may be made in the minor details of construction within the scope of the appended claim.

The figure is a side elevation of my improved force pump with parts broken away.

Referring now to the drawing in which like characters of reference designate similar parts, 10 designates a pump cylinder which is provided at one end with an approximately frusto-conical base 11 through the marginal edge portion of which screws or like fasteners 12 are engaged for rigidly securing the pump cylinder to a suitable support. The opposite end of the cylinder is closed by a flange cap 13 through which the stem 14 of a piston 15 works, the stem being equipped with the usual grip 16 on its outer end. The piston stem is less than one-half as long as the pump cylinder, and thus the stroke of the piston is less than one-half the length of the cylinder, and to limit the piston stroke the grip 16 is designed to contact with the marginal portions of the piston stem opening in the flange cap 13, this contacting of the cap and grip taking place prior to the arrival of the piston at the juncture of the oil cup nipple 17 with the pump cylinder.

The nipple is formed integral with one side of the cylinder and is located approximately midway between the extreme ends of the cylinder. Screw threads are formed internally upon the nipple, and a threaded plug 18 is threaded down into the nipple. This plug is tubular in contour and has its upper end closed, the closed end being formed with a conical orificed valve seat 19 the apex of which is directed toward the outer end of the nipple. The opposite end of the tubular plug is provided with an internal flange 20. The stem 21 of a conical valve 22 projects axially through the tubular plug and upon the stem is seated a helical spring 23, this spring bearing with its opposite terminal convolutions against the flange 20 and base of the conical valve and operating to normally hold the valve in its seat 19. One end of the plug projects into the interior of the pump cylinder and performs the function of an emergency stop which will engage with the piston 15 and limit advancing movement of the piston in the pump cylinder should the grip 16 accidentally become displaced.

The hollow exteriorly threaded stem 24 of an ordinary oil cup 25 is advanced into the threaded outer end of the nipple 17. It is clear during outward movement of the piston that the suction created will move the valve 22 against the pressure of its spring out of its seat and suck lubricant into the pump cylinder. The lubricant in the cylinder is forced out of the cylinder during advancing movement of the piston.

Formed integral with one side of the pump cylinder is a nipple 26 which is both exteriorly and interiorly threaded. A tubular plug 27 is threaded into the bore of the nipple, one end of this plug projecting considerably into the interior of the pump cylinder and being closed as shown, this closed end being centrally provided with a conical orificed valve seat 28 the apex of which is directed toward the interior of the pump cylinder. The opposite end of the plug is equipped internally with a flange 29. The stem 30 of a conical valve 31 projects axially through the plug, and upon this plug is seated a helical spring 32 which bears with its opposite terminal convolutions against the flange and base of the valve, this spring normally holding the valve seated in its seat. A flange cap 33 threads on the outer end of the nipple 26 and is provided centrally with an orifice into which one end of a pipe 34 is fitted, this orifice communicating with the interior of the nipple 26.

By virtue of the valve seat 28 being arranged with its apex directed toward the interior of the pump cylinder, during advancing movement of the piston in the pump cylinder, the pressure created thereby will force the valve against the pressure of its spring out of its seat and permit of the escape of lubricant into the pipe 34. During retractive movement of the piston, the suction created thereby will draw the valve into its seat and prevent the return of lubricant into the pump cylinder.

In operation, the pump cylinder may be filled with oil as also the oil cup. During the first advancing stroke of the piston, the oil cup valve 22 is closed while at the same time the feed pipe valve 31 is opened and permits of the escape of lubricant into the feed pipe. During outward or retractive movement of the piston, the oil cup valve is opened permitting of lubricant being drawn from the oil cup into the pump cylinder. At the same time the feed pipe valve is closed and return of the lubricant in the feed pipe to the pump cylinder prevented. On the next advancing stroke of the piston the lubricant drawn from the oil cup into the pump cylinder is forced out into the feed pipe as will be understood.

It will be noted that by virtue of the relatively large bore of the pump cylinder and short stroke of the piston that a powerful pressure is generated to force lubricant through the feed pipe so that the force pump may be used on the ground to elevate a column of lubricant up to the gearing of a windmill or the like. By virtue of the stroke of the piston terminating short of the oil cup valve, the piston will perform actual work at every point in its stroke.

What is claimed, is:—

A lubricant force pump including a pump cylinder, a piston in said cylinder, a pair of laterally projecting nipples on one side of said cylinder, a tubular plug in each nipple, one of said plugs having a conical valve seat the apex of which is directed toward the outer end of the related nipple, and the other of said plugs having a conical valve seat the apex of which is directed toward the interior of the pump cylinder, valves in said seats, an oil cup assembled with one of said nipples, and a feed pipe assembled with the other of said nipples.

In testimony whereof, I affix my signature, in presence of two witnesses.

LA TRELLE F. BUEHRIG.

Witnesses:
L. E. AUSMAN,
R. F. WRIGHT.

---

Copies of this patent may be obtained for five cents each, by addressing the "Commissioner of Patents, Washington, D. C."